US008962096B2

(12) United States Patent
Ren et al.

(10) Patent No.: US 8,962,096 B2
(45) Date of Patent: Feb. 24, 2015

(54) METHOD FOR PREPARING A HIGH TEMPERATURE POLYMER COATING

(71) Applicants: Jiaxiang Ren, Houston, TX (US); David Gerrard, Magnolia, TX (US)

(72) Inventors: Jiaxiang Ren, Houston, TX (US); David Gerrard, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 66 days.

(21) Appl. No.: 13/686,966

(22) Filed: Nov. 28, 2012

(65) Prior Publication Data
US 2014/0147609 A1    May 29, 2014

(51) Int. Cl.
*B05D 1/02* (2006.01)
*B05D 1/06* (2006.01)
*B05D 1/12* (2006.01)
*C09D 181/06* (2006.01)
*C09D 165/02* (2006.01)
*C09D 181/04* (2006.01)
*C09D 171/00* (2006.01)

(52) U.S. Cl.
CPC ............ *C09D 181/06* (2013.01); *C09D 165/02* (2013.01); *C09D 181/04* (2013.01); *C09D 171/00* (2013.01); *C08G 2261/135* (2013.01); *C08G 2261/312* (2013.01); *C08G 2261/592* (2013.01); *C08G 2261/598* (2013.01); *C08G 2261/76* (2013.01); *C08G 2650/40* (2013.01)
USPC .......................... 427/475; 427/195; 427/427.4

(58) Field of Classification Search
USPC ....................... 427/475, 195, 427.4
See application file for complete search history.

(56) References Cited

U.S. PATENT DOCUMENTS

| 3,373,544 | A | | 3/1968 | Catlin et al. | |
|---|---|---|---|---|---|
| 3,958,758 | A | | 5/1976 | Piorkowski | |
| 4,036,822 | A | * | 7/1977 | Patel et al. | 528/388 |
| 4,118,537 | A | | 10/1978 | Vary et al. | |
| 4,204,021 | A | | 5/1980 | Becker | |
| 4,396,658 | A | * | 8/1983 | Mettes et al. | 428/35.8 |
| 4,659,768 | A | | 4/1987 | Tortorello et al. | |
| 5,698,663 | A | | 12/1997 | Kinneberg | |
| 8,097,320 | B2 | | 1/2012 | Wu et al. | |
| 2003/0113465 | A1 | * | 6/2003 | Baumann et al. | 427/425 |
| 2010/0092671 | A1 | | 4/2010 | Goscha et al. | |

FOREIGN PATENT DOCUMENTS

WO    9808614 A1    3/1998

OTHER PUBLICATIONS

ASTM International, "Standard Test Method for Pull-Off Strength of Coatings Using Portable Adhesion Testers," Designation: D4541-09, pp. 1-16.
ASTM International, "Standard Practice for Qualitative Adhesion Testing of Metallic Coatings," Designation: B 571-97 (Reapproved 2008), pp. 1-4.
International Search Report for related PCT Application No. PCT/US2013/066574, dated Feb. 20, 2014, pp. 1-3.

* cited by examiner

*Primary Examiner* — Frederick Parker
(74) *Attorney, Agent, or Firm* — Cantor Colburn LLP

(57) ABSTRACT

A method for coating a substrate includes impacting a substrate with a plurality of particles such that the particles adhere to the substrate, bonding the particles to the substrate to form an overlayer, and crosslinking the particles in the overlayer to coat the substrate with a crosslinked polymer coating. The particles comprise a polyphenyl polymer. An article includes a substrate and a crosslinked polymer coating bonded to the substrate. The crosslinked polymer coating is a product of crosslinking polyphenylene sulfide, polyphenylsulfone, self-reinforced polyphenylene, or a combination thereof on a surface of the substrate.

19 Claims, No Drawings

METHOD FOR PREPARING A HIGH TEMPERATURE POLYMER COATING

BACKGROUND

An environment such as an oil or gas well in an oilfield or undersea environment, a geothermal borehole, a carbon dioxide sequestration hole, refinery devices, fluid and gas transport lines and containers, and other such surface and downhole environments may expose equipment used in these environments to severe conditions of temperature, pressure, or corrosiveness. For example, equipment such as packers, blow out preventers, drilling motors, drilling bits, pipelines, etc. may be exposed to conditions that can affect the integrity or performance of the element and tools, and in particular, the performance of components of these tools fabricated from plastics or metals.

Plastic and metallic components having thermal, mechanical, and barrier properties are used in such environments that have a variety of such different and challenging conditions. These components however can be damaged by high temperature, corrosive, or lipophilic conditions found in these environments. Where an article has a rubber, plastic, or metal part, environmental conditions can cause, for example, swelling or corrosion by contact with hydrocarbon oil, water, brine, acid, or other materials found in such environments. This contact can weaken the structural integrity of the element or cause the element to have poor dimensional stability, resulting in difficulty in placing, activating, or removing the element.

Advances in methods and materials to ameliorate environmental effects on such components are well received by the industry.

BRIEF DESCRIPTION

The above and other deficiencies of the prior art are overcome by, in an embodiment, a method for coating a substrate, the method comprising: impacting a substrate with a plurality of particles such that the particles adhere to the substrate, the particles comprising a polyphenyl polymer; bonding the particles to the substrate to form an overlayer; and crosslinking the particles in the overlayer to coat the substrate with a crosslinked polymer coating.

In another embodiment, an article comprises: a substrate; and a crosslinked polymer coating bonded to the substrate wherein the crosslinked polymer coating is a product of crosslinking polyphenylene sulfide, polyphenylsulfone, self-reinforced polyphenylene, polyaryletherketone, or a combination thereof on a surface of the substrate.

DETAILED DESCRIPTION

A detailed description of one or more embodiments is presented herein by way of exemplification and not limitation.

It has been found that a crosslinked polymer coating bonded to a substrate has advantageous material properties that protect the substrate from deterioration or changes due to a local environmental condition. The crosslinked polymer coating is a barrier that is durable as well as thermally and chemically stable. Moreover, the crosslinked polymer coating forms without defects on various substrates. A method herein for forming the crosslinked polymer coating is rapid and efficient. Furthermore, the method produces the crosslinked polymer coating in a controlled thickness and having superior properties such as chemical resistance, barrier properties to fluids (gas or liquid), substrate adhesion, retention of mechanical properties at elevated temperatures, scratch resistance, and high resilience to peeling from a substrate.

In an embodiment, a method for coating a substrate includes impacting a substrate with a plurality of particles, which include a polyphenyl polymer, such that the particles adhere to the substrate, bonding the particles to the substrate to form an overlayer, and crosslinking the particles in the overlayer to coat the substrate with a crosslinked polymer coating.

The particles include, for example, a polyphenyl polymer. As used herein, the term "polyphenyl polymer" refers to a polymer having, in the backbone of the polymer, a phenyl group, substituted phenyl group, or phenyl group and a heteroatom (e.g., sulfur or oxygen) with an optional ketone group. Exemplary polyphenyl polymers include polyphenylene sulfide (PPS), polyphenylsulfone (PPSU), self-reinforced polyphenylene (SRP), polyaryletherketone (PAEK), a crosslinked product thereof, a combination thereof, and the like.

The SRP can have a repeat unit that includes 1,3-phenylene, benzoyl-1,4-phenylene, phenoxy-benzoyl-1,4-phenylene, derivatives thereof, or a combination thereof. The phenyl ring of the repeat unit can be substituted. In an embodiment, the 1,3-phenylene repeat unit has a structure of formula (1):

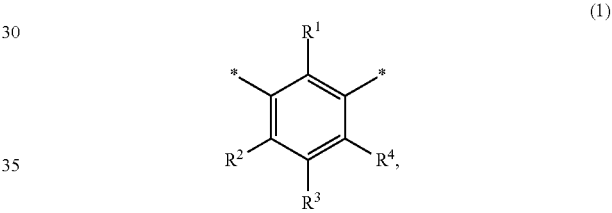

wherein asterisk (*) denotes the point of attachment in the SRP backbone, $R^1$, $R^2$, $R^3$, and $R^4$ are substituents on the phenyl ring wherein $R^1$, $R^2$, $R^3$, and $R^4$ are the same or different, and $R^1$, $R^2$, $R^3$, and $R^4$ independently are hydrogen, C1-C5 alkyl group, C1-C5 alkene group, C1-C5 alkoxy group, halogen (e.g., chlorine, bromine, or iodine), C3-C18 aryl group, or a combination thereof, and each foregoing group can be substituted or unsubstituted. Moreover, the alkyl, alkene, and alkoxy groups can be linear or branched. In a specific embodiment, the 1,3-phenylene repeat unit is 1,3-phenylene.

In an embodiment, the benzoyl-1,4-phenylene repeat unit has a structure of formula (2):

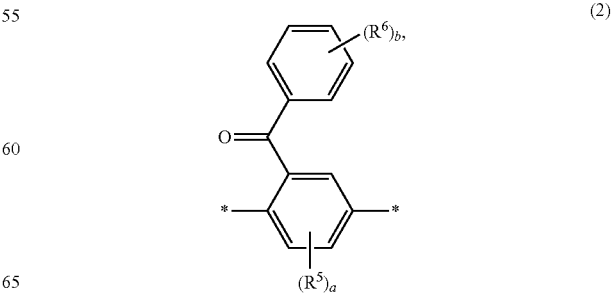

wherein asterisk (*) denotes the point of attachment in the SRP backbone;

a and b independently are an integer from 0 to 5, provided that the valence of the phenyl ring is completely filled and not exceeded; and $R^5$ and $R^6$ are a substituent on a phenyl ring wherein each $R^5$ and $R^6$ is the same or different, and $R^5$ and $R^6$ independently are hydrogen, C1-C5 alkyl group, C1-C5 alkene group, C1-C5 alkoxy group, halogen (e.g., chlorine, bromine, or iodine), C3-C18 aryl group, or a combination thereof, and each foregoing group can be substituted or unsubstituted. Moreover, the alkyl, alkene, and alkoxy groups can be linear or branched. In a specific embodiment, the benzoyl-1,4-phenylene repeat unit is benzoyl-1,4-phenylene.

In an embodiment, the phenoxy-benzoyl-1,4-phenylene repeat unit has a structure of formula (3):

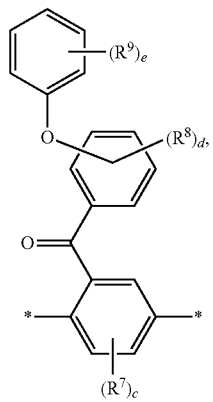

(3)

wherein asterisk (*) denotes the point of attachment in the SRP backbone;

c, d, and e independently are an integer from 0 to 5, provided that the valence of the phenyl ring is completely filled and not exceeded; and $R^7$, $R^8$, and $R^9$ are substituents on a phenyl ring; $R^7$, $R^8$, and $R^9$ are the same or different; and $R^7$, $R^8$, and $R^9$ independently are hydrogen, C1-C5 alkyl group, C1-C5 alkene group, C1-C5 alkoxy group, halogen (e.g., chlorine, bromine, or iodine), C3-C18 aryl group, or a combination thereof, and each group can be substituted or unsubstituted. Moreover, the alkyl, alkene, and alkoxy groups can be linear or branched. In a specific embodiment, the phenoxy-benzoyl-1,4-phenylene repeat unit is 4'-phenoxybenzoyl-1,4-phenylene.

The repeat units (i.e., the 1,3-phenylene repeat unit, benzoyl-1,4-phenylene repeat unit, phenoxybenzoyl-1,4-phenylene repeat unit) given by formulas (1), (2), and (3) can be obtained starting from monomers such as those represented by formulas (4) and (5):

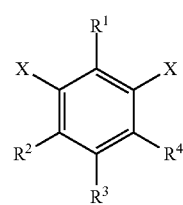

(4)

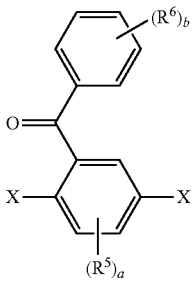

(5)

wherein X is a halogen, and R1 to R6 is as defined in either formula (1) or (2). In a particular embodiment, the monomers of formulas (4) and (5) are 1,3-dichlorobenzene, 2,5-dichlorobenzophenone, or 4'-phenoxy-2,5-dichlorobenzophenone.

In one embodiment, the SRP is a copolymer of benzoyl-1,4-phenylene and 1,3-phenylene. This SRP can be made by a method described in U.S. Pat. No. 5,976,437, the disclosure of which is incorporated herein in its entirety.

The polyaryletherketone can have a repeat unit that includes a phenylene group, ether group, ketone group, derivatives thereof, or a combination thereof. The phenyl ring of the repeat unit can be substituted in an embodiment. Exemplary polyaryletherketone polymers include polyetherketone (PEK), polyetheretherketone (PEEK), polyetherketoneketone (PEKK), polyetheretherketoneketone (PEEKK), polyetherketoneetherketoneketone (PEKEKK), and the like.

In addition to the polyphenyl polymer, the particles can include a crosslinker, additive, or a combination thereof. The crosslinker can be in a particle separate from a particle that contains the polyphenyl polymer. The crosslinker and polyphenyl polymer can be in the same particle. Similarly, the additive can be in the same or different particle than the polyphenyl polymer. In some embodiments, the polyphenyl polymer, crosslinker, and additive are in the same particle or are in different particles.

Additives include reinforcing and non-reinforcing additives. Reinforcing additives include, for example, silica, glass fiber, carbon fiber, or carbon black, which can be added to the particles to increase strength of the crosslinked polymer coating. Non-reinforcing additives include a pigment, dye, stabilizer, flow improver, plasticizer (e.g., glycols, C16-C22 fatty alcohols, C8-C22 fatty acids, phthalates, or phosphates), lubricant (e.g., graphene, titanium dioxide), and the like. Nanofillers are also a useful additive and can be reinforcing or non-reinforcing. Certain additives such as calcium carbonate, talc, titanium oxide, silica, clay, barium sulfate, magnesium carbonate, or ceramic can be added to the particles to attain an improvement in heat resistance, aging, or the like of the crosslinked polymer coating.

The nanofillers are generally particles having an average particle size in at least one dimension, of less than one micrometer (μm). As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. Nanofillers can include both particles having an average particle size of 250 nm or less, and particles having an average particle size of greater than 250 nm to less than 1 µm (sometimes referred to in the art as "sub-micron sized" particles). In an embodiment, a nanofiller can have an average particle size of 0.1 to 900 nanometers (nm), specifically 0.5 to 250 nm, and more specifically 0.5 to about 150 nm. The nanofiller can be monodisperse, where all particles are of the same size with little variation, or polydisperse, where the particles have a range of sizes and are averaged. Generally, polydisperse nanofillers are used. Nanofillers of different average particle size may be used, and in this way, the particle size distribution of the nanofiller can be unimodal (exhibiting a single distribution), bimodal exhibiting two distributions, or multi-modal, exhibiting more than one particle size distribution.

The nanofiller disclosed herein includes a fullerene, single wall nanotube, multiwall nanotube, nanographite, nanographene, graphene fiber, nanodiamonds, polysilsesquioxanes, silica nanoparticles, nanoclay, metal particles, or a combination thereof. In an embodiment, the nanofiller is carbon nanofiber, carbon nanotubes, and the like. The nanofiller can be incorporated in the particles with the polyphenyl polymer to increase the strength of the crosslinked polymer coating. In an embodiment, metallic nanotubes (e.g., metallic carbon nanotubes (such as, (n,m)-single wall nanotubes), organometallic nanotubes, metal nanotubes, and the like) are included in the particles. Nanofillers can further be functionalized to include polymer grafts or functional groups to adjust properties such as chemical compatibility (e.g., solid-state miscibility or non-agglomeration of the nanofiller), surface charge, hydrophilicity, lipophilicity, and other properties.

Fullerenes, as disclosed herein, may include any of the known cage-like hollow allotropic forms of carbon possessing a polyhedral structure. Fullerenes may include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes may include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes may include carbon nanotubes, inorganic nanotubes, metallated nanotubes, or a combination comprising at least one of the foregoing. Carbon nanotubes are tubular fullerene structures having open or closed ends and which may be inorganic or made entirely or partially of carbon, and may include also components such as metals or metalloids. Nanotubes, including carbon nanotubes, may be single walled nanotubes (SWNTs) or multi-walled nanotubes (MWNTs).

Nanographite is a cluster of plate-like sheets of graphite, in which a stacked structure of one or more layers of graphite, which has a plate-like two dimensional structure of fused hexagonal rings with an extended delocalized π-electron system, are layered and weakly bonded to one another through π-π stacking interaction. Nanographite has both micro- and nano-scale dimensions, such as for example an average particle size of 1 to 20 µm, specifically 1 to 15 µm, an average thickness (smallest) dimension in nano-scale dimensions, and an average thickness of less than 1 µm, specifically less than or equal to 700 nm, and still more specifically less than or equal to 500 nm.

In an embodiment, the nanofiller is a graphene including nanographene and graphene fibers (i.e., graphene particles having an average largest dimension of greater than 1 mm and an aspect ratio of greater than 10, where the graphene particles form an interbonded chain). Graphene and nanographene, as disclosed herein, are effectively two-dimensional particles of nominal thickness, having one or more layers of fused hexagonal rings with an extended delocalized π-electron system, layered and weakly bonded to one another through π-π stacking interaction. Graphene in general, and including nanographene, can be a single sheet or a stack of several sheets having both micro- and nano-scale dimensions, such as in some embodiments an average particle size of 1 to 20 µm, specifically 1 to 15 µm, and an average thickness (smallest) dimension in nano-scale dimensions of less than or equal to 50 nm, specifically less than or equal to 25 nm, and more specifically less than or equal to 10 nm. An exemplary nanographene can have an average particle size of 1 to 5 µm, and specifically 2 to 4 µm. In addition, smaller nanofiller or sub-micron sized nanofiller as defined above may be combined with nanofiller having an average particle size of greater than or equal to 1 µm.

Graphene, including nanographene, can be prepared by exfoliation of nanographite or by a synthetic procedure by "unzipping" a nanotube to form a nanographene ribbon, followed by derivatization of the nanographene to prepare, for example, nanographene oxide.

Exfoliation to form graphene or nanographene can be carried out by exfoliation of a graphite source such as graphite, intercalated graphite, and nanographite. Exemplary exfoliation methods include, but are not limited to, those practiced in the art such as fluorination, acid intercalation, acid intercalation followed by thermal shock treatment, and the like, or a combination comprising at least one of the foregoing. Exfoliation of the nanographite provides a nanographene having fewer layers than non-exfoliated nanographite. It will be appreciated that exfoliation of nanographite may provide the nanographene as a single sheet only one molecule thick, or as a layered stack of relatively few sheets. In an embodiment, exfoliated nanographene has fewer than 50 single sheet layers, specifically fewer than 20 single sheet layers, specifically fewer than 10 single sheet layers, and more specifically fewer than 5 single sheet layers.

Polysilsesquioxanes, also referred to as polyorganosilsesquioxanes or polyhedral oligomeric silsesquioxanes (POSS) derivatives are polyorganosilicon oxide compounds of general formula $RSiO_{1.5}$ (where R is an organic group such as methyl) having defined closed or open cage structures (closo or nido structures). Polysilsesquioxanes, including POSS structures, can be prepared by acid and/or base-catalyzed condensation of functionalized silicon-containing monomers such as tetraalkoxysilanes including tetramethoxysilane and tetraethoxysilane, alkyltrialkoxysilanes such as methyltrimethoxysilane and methyltrimethoxysilane.

Nanoclays can be used in the particles with the polyphenyl polymer. Nanoclays may be hydrated or anhydrous silicate minerals with a layered structure and can include, for example, alumino-silicate clays such as kaolins including hallyosite, smectites including montmorillonite, illite, and the like. Exemplary nanoclays include those marketed under the tradename CLOISITE® marketed by Southern Clay Additives, Inc. Nanoclays can be exfoliated to separate individual sheets, or may be non-exfoliated, and further, can be dehydrated or included as hydrated minerals. Other nano-sized mineral fillers of similar structure can also be included such as, for example, talc, micas including muscovite, phlogopite, or phengite, or the like.

Inorganic nanofillers can also be included in the particles with the polyphenyl polymer. Exemplary inorganic nanofiller may include a metal or metalloid carbide such as tungsten carbide, silicon carbide, boron carbide, or the like; a metal or metalloid nitride such as titanium nitride, boron nitride, silicon nitride, or the like; or a metal nanofiller such as iron, tin, titanium, platinum, palladium, cobalt, nickel, vanadium, alloys thereof, or a combination thereof.

The nanofiller herein can be derivatized to include functional groups such as, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, or a combination thereof. The nanofiller, including nanographene after exfoliation, can be derivatized to introduce chemical functionality to the nanofiller. For example, for nanographene, the surface and/or edges of the nanographene sheet can be derivatized to increase dispersibility in and interaction with the particles including polyphenyl polymer. In an embodiment, the derivatized nanofiller can be hydrophilic, hydrophobic, oxophilic, lipophilic, or can possess a combination of these properties to provide a balance of desirable net properties, by use of different functional groups.

In an embodiment, the nanofiller can be further derivatized by grafting certain polymer chains to the functional groups. For example, polymer chains such as alkyl chains, akenyl chains, aromatic chains can be included by reaction with functional groups.

The functional groups of the derivatized nanofiller can react directly with other components of the particles, including reactive functional groups that may be present in the polyphenyl polymer, leading to improved tethering/reaction of the derivatized nanofiller in the crosslinked polymer coating.

Combinations comprising at least one of the foregoing additives can be used and can enhance barrier properties of the crosslinked polymer coating such as by decreasing a diffusion coefficient of a fluid through the crosslinked polymer coating to the substrate. Some of these additives can impart the crosslinked polymer coating with electrical or thermal conductivity that might otherwise be absent when using particles having the polyphenyl polymer without the additive.

The additive can be present in an amount up to 25 weight percent, specifically from 0.1 wt % to 25 wt %, more specifically 0.1 wt % to 15 wt %, and more specifically 0.1 wt % to 5 wt %, based on a weight of the polyphenyl polymer.

The crosslinker in the particles can include a peroxy compound, metal peroxide, metal oxide, quinone, silica, sulfur or a combination thereof. As noted above, the crosslinker can be in the same particle as polyphenyl polymer or in a separate particle than the polyphenyl polymer. Thus, crosslinking of the polyphenyl polymer can occur in the same particle or between different particles.

Exemplary quinones include p-benzoquinone, tetramethylbenzoquinone, naphthoquinone, and the like. Peroxy compounds useful as crosslinkers include alkyl or aryl diperoxy compounds, and metal peroxides. Exemplary aryl diperoxy compounds include those based on dicumyl peroxide (DCP) and marketed by Arkema, Inc. under the tradename DI-CUP® including, DI-CUP® dialkyl peroxide, DI-CUP® 40C dialkyl peroxide (on calcium carbonate support), DI-CUP® 40K dialkyl peroxide, DI-CUP® 40KE dialkyl peroxide; and alkyl diperoxy compounds including 2,5-dimethyl-2,5-di(t-butylperoxy) hexane and marketed by Akzo-Nobel under the tradename TRIGONOX® 101. Exemplary metal peroxides include magnesium peroxide, calcium peroxide, zinc peroxide, or the like, or a combination thereof. Metal oxides useful as crosslinkers include, for example, zinc oxide, magnesium oxide, titanium dioxide, or the like, or a combination thereof.

The crosslinker can be present in an amount from 0.1 wt % to 15 wt %, specifically 0.5 wt % to 10 wt %, and more specifically 0.5 wt % to 5 wt %, based on the weight of the polyphenyl polymer in the particles.

The crosslinked polymer coating is formed from the particles on a substrate. The substrate can be, for example, a metal, polymer, ceramic, glass, paper, wood, or a combination thereof. The substrate is a bulk material as compared to the size of the particles used to coat the substrate. Moreover, the substrate can be used without surface processing or can be processed, including chemically, physically, or mechanically treating the substrate. Due to the efficacy of adhering the particles on the substrate and forming the crosslinked polymer coating thereon, the substrate does not need a primer on the substrate. Such primers can include metal oxides and functional groups bonded to the substrate.

In an embodiment, the substrate is a metal. The metal includes elements from Group 1 to Group 12 of the periodic table, oxides thereof, carbides thereof, alloys thereof, or a combination thereof. Exemplary metals are magnesium, aluminum, titanium, manganese, iron, cobalt, nickel, copper, molybdenum, tungsten, palladium, chromium, ruthenium, gold, silver, zinc, zirconium, vanadium, silicon, or a combination thereof, including alloys thereof. Metal alloys include, for example, an aluminum-based alloy, magnesium-based alloy, tungsten-based alloy, cobalt-based alloy, iron-based alloy, nickel-based alloy, cobalt and nickel-based alloy, iron and nickel-based alloy, iron and cobalt-based alloy, copper-based alloy, and titanium-based alloy. As used herein, the term "metal-based alloy" means a metal alloy wherein the weight percentage of the specified metal in the alloy is greater than the weight percentage of any other component of the alloy, based on the total weight of the alloy. Exemplary metal alloys include steel, nichrome, brass, pewter, bronze, invar, inconel, hastelloy, MgZrZn, MgAlZn, AlCuZnMn, and AlMgZnSiMn.

The ceramic is not particularly limited and can be selected depending on the particular application of the substrate that has been coated with the crosslinked polymer coating. Examples of the ceramic include an oxide-based ceramic, nitride-based ceramic, carbide-based ceramic, boride-based ceramic, silicide-based ceramic, or a combination thereof. In an embodiment, the oxide-based ceramic is silica ($SiO_2$) or titania ($TiO_2$). The oxide-based ceramic, nitride-based ceramic, carbide-based ceramic, boride-based ceramic, or silicide-based ceramic can contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like).

The glass can be a silicon oxide-containing material in a solid, amorphous state without crystallization. Such glass can have a high degree of microstructural disorder due to a lack of long-range order. The glass can include an oxide, for example, silicon dioxide ($SiO_2$), aluminum oxide ($Al_2O_3$), barium oxide (BaO), bismuth trioxide ($Bi_2O_3$), boron oxide ($B_2O_3$), calcium oxide (CaO), cesium oxide (CsO), lead oxide (PbO), strontium oxide (SrO), rare earth oxides (e.g., lanthanum oxide ($La_2O_3$), neodymium oxide ($Nd_2O_3$), samarium oxide ($Sm_2O_3$), cerium oxide ($CeO_2$)), and the like.

An exemplary glass is $SiO_2$ (e.g., quartz, cristobalite, tridymite, and the like). The glass can include $SiO_2$ and other components such as elements, for example, aluminum, antimony, arsenic, barium, beryllium, boron, calcium, cerium, cesium, chromium, cobalt, copper, gallium, gold, iron, lanthanum, lead, lithium, magnesium, manganese, molybdenum, neodymium, nickel, niobium, palladium, phosphorus, platinum, potassium, praseodymium, silver, sodium, tantalum, thorium, titanium, vanadium, zinc, zirconium, and the like. The elements can occur in the glass in the form of oxides, carbonates, nitrates, phosphates, sulfates, or halides. Furthermore, the element can be a dopant in the glass. Exemplary doped glass includes borosilicate, borophosphosilicate, phosphosilicate, colored glass, milk glass, lead glass, optical glass, and the like.

In an embodiment, the glass can include non-amorphous, crystalline domains. Such glass can be, for example, a salt or ester of orthosilicic acid or a condensation product thereof, e.g., a silicate. Exemplary silicates are cyclosilicates, inosilicates, mesosilicates, orthosilicates, phyllosilicates, sorosilicates, tectosilicates, and the like. These glasses have a structure based on silicon dioxide or isolated or linked $[SiO_4]^{4-}$ tetrahedral and include other components such as, for example, aluminum, barium, beryllium, calcium, cerium, iron, lithium, magnesium, manganese, oxygen, potassium, scandium, sodium, titanium, yttrium, zirconium, zinc, hydroxyl groups, halides, and the like.

In an embodiment, the substrate is a polymer substrate. The polymer substrate can be a thermoset polymer, thermoplastic polymer, or a combination thereof. The polymer substrate can be a blend of polymers, copolymers, terpolymers, or a combination thereof. The polymer substrate can also be an oligomer, a homopolymer, a copolymer, a block copolymer, an alternating block copolymer, a random polymer, a random copolymer, a random block copolymer, a graft copolymer, a star block copolymer, a dendrimer, or the like, or a combination thereof.

The polymer substrate can be the same or is not the same as the polyphenol polymer in the particles or crosslinked polymer coating formed on the substrate. Exemplary polymer substrates include epoxies, ethylene propylene diene rubber (EPR), ethylene propylene diene monomer rubber (EPDM), melamines, polyacetals, polyacrylamides, polyacrylics such as polyacrylic acid, polyacrylonitriles, polyamides, including polyamideimide, polyarylene ethers, polyarylene sulfides, polyarylene sulfones, polybenzoxazoles, polybenzothiazole, polybutadienes and copolymers thereof, polycarbonates, polycarbonate esters, polyether ketones, polyether ether ketones, polyether ketone ketones, polyethersulfones, polyesters, polyimides such as polyetherimides, polyisoprenes and copolymers thereof, polyolefins such a polyethylene and copolymers thereof, polypropylene and copolymers thereof, and polytetrafluoroethylene, polyphosphazenes, poly(alkyl) (meth)acrylates, polystyrenes and copolymers thereof, rubber-modified polystyrenes such as acrylonitrile-butadiene-styrene (ABS), styrene-ethylene-butadiene (SEB), and methyl methacrylate-buadiene-styrene (MBS), polyoxadiazoles, polysilazanes, polysulfones, polysulfonamides, polyvinyl acetates, polyvinyl chlorides, polyvinyl esters, polyvinyl ethers, polyvinyl halides, polyvinyl nitriles, polyvinyl thioethers, polyureas, polyurethanes, and silicones. A combination comprising at least one of the foregoing polymer substrates can be used. In an embodiment, the polymer substrate is a polyamide or polyimide. It is to be understood that "not the same" means that the polymer substrate and polyphenyl polymer differ in at least one property, e.g., degree or type of crosslinking. Thus, a polyphenyl polymer such as a PPS having a first degree of crosslinking or Tg is not the same as a polymer substrate having the same backbone but a different degree of crosslinking or Tg.

In an embodiment, the polymer substrate is a fluoropolymer. Exemplary fluoropolymer polymer substrates include polytetrafluoroethylene (PTFE, available under the trade name Teflon from DuPont), polyethylenetetrafluoroethylene (ETFE, available under the trade name Teflon ETFE or Tefzel from DuPont), fluorinated ethylene propylene copolymer (FEP, available under the trade name Teflon FEP from DuPont), perfluoroalkoxy polymer (PFA, available under the trade name Teflon PFA from DuPont), polyvinylidene fluoride (PVDF, available under the trade name Hylar from Solvay Solexis S.p.A.), polyvinylfluoride (PVF, available under the trade name Tedlar from DuPont), polychlorotrifluoroethylene (PCTFE, available under the trade name Kel-F from 3M Corp. or Neoflon from Daikin), polyethylenechlorotrifluoroethylene (ECTFE, available under the trade name Halar ECTFE from Solvay Solexis S.p.A.), chlorotrifluoroethylenevinylidene fluoride (FKM fluorocarbon, available under the trade name Viton from FKM-Industries), perfluoroelastomer such as FFKM (available under the trade name Kalrez from DuPont), tetrafluoroethylene-propylene elastomeric copolymers such as those available under the trade name Aflas from Asahi Glass Co), perfluoropolyether (available under the trade name Krytox from DuPont), perfluorosulfonic acid (available under the trade name Nafion from DuPont), and the like. Other exemplary fluoropolymers include copolymers of vinylidene fluoride and hexafluoropropylene and terpolymers of vinylidene fluoride, hexafluoropropylene, and tetrafluoroethylene.

The substrate can be any shape. Exemplary shapes include a cube, sphere, cylinder, toroid, polygonal shape, helix, truncated shape thereof, or a combination thereof. The longest linear dimension of the substrate can be from 500 nm to hundreds of meters, without limitation. The substrate can have a thermal decomposition temperature that can withstand, without decomposition or degradation, exposure to a temperature from −10° C. to 450° C. However, the crosslinked polymer coating bound to the substrate can provide temperature shielding or thermal conductance to carry heat away from the substrate so that the substrate does not experience a temperature near its thermal decomposition temperature.

In an embodiment, the particles impact the substrate. The particles can be, for example, a powder. The powder can be formed from a bulk polyphenyl polymer by comminuting the bulk to produce the powder. An example bulk material is a block or pellet of the polyphenyl polymer. Pellets can be made from a larger bulk item of polyphenyl polymer by extrusion, for example. According to an embodiment, forming the powder from the bulk polyphenyl powder can be achieved by ambient temperature or cryogenic grinding of pellets into a powder. A disk grinding mill, turbo mill, pin mill, hummer mill, or a rotor speed mill can be used for grinding at ambient temperatures. When grinding is conducted in a grinding mill, polyphenyl polymer pellets can be fed into the interstices of the disks and subjected to rotational force. The pellets can be ground to a desired particle size and separated from those that are not the desired size by using a mesh screen. Thus, the particle size can be controlled. Without wishing to be bound by theory, it is believed that particle size is a factor that can determine a thickness of the crosslinked polymer coating formed on the substrate. Since the particle size can be controlled, the thickness of the crosslinked polymer coating can similarly be controlled and can be tailored for a specific application of the crosslinked polymer coated substrate.

The size of the particles can be from 0.5 nm to 500 micrometers (μm), specifically 1 nm to 100 μm, and more specifically 50 nm to 50 μm. The distribution of the size of the particles can be unimodal, bimodal, or multimodal. Generally, for particles applied to the substrate by thermal spraying, the size of the particles can be, for example, less than 250 μm. For particles applied to the substrate by electrostatic acceleration, the particle can be less than 100 μm. The average size and size distribution of the particles can be determined by light scattering. Although a solvent or dispersal fluid can be used with the particles, the particles can be used dry, without any solvent or other liquid.

The polyphenyl polymer can be combined with the crosslinker, additive (e.g., nanofiller), or a combination thereof by mixing or blending the powder of polyphenyl polymer with the crosslinker or additive. Alternatively, the polyphenyl polymer can be compounded with the crosslinker or additive so that individual particles include the polyphenyl polymer with crosslinker or additive. In an embodiment, the polyphenyl polymer is combined with the crosslinker or additive to form particles with high homogeneity.

In an embodiment, prior to impacting the substrate with the particles, the substrate can be subjected to a treatment. In an embodiment, the substrate is treated to functionalize the substrate (e.g., the polymer substrate), treated to bond reactive groups to the substrate (e.g., a surface of a metal substrate), and the like. The treatment can be, e.g., oxidation of a metal substrate to form an oxide that can interact or react with polyphenyl polymer in the particles. The substrate can be treated to roughen or increase a surface area of the substrate, e.g., by sanding, lapping, or sand blasting. It is believed that roughening or increasing the surface area of the substrate can increase the probability for bonding with the particles since it is contemplated that reactive portions of a surface of, e.g., a metal substrate include surface defects such as step edges and grain boundaries. Treatment of a substrate such as glass, ceramic, or semiconductor material can include etching the substrate to form a pattern so that the particles are disposed in grooves formed by an etchant.

A primer can be disposed on the substrate to increase the probability of adherence of the particles to the substrate or to increase the strength of the bond between the particles and the substrate. Various primers can be disposed on the substrate such as a metal oxide (e.g., zinc oxide, chromium oxide, magnesium oxide, lead oxide, iron oxide, cadmium oxide, zirconium oxide, calcium oxide, and the like), resin (e.g., phenolic resin, phenoxy resin, nitrile butadiene rubber (NBR), hydrogenated nitrile rubber (HNBR), chlorosulfonated polyethylene (CSE), chlorinated polyethylene (CPE), chlorinated natural rubber, chlorinated styrene butadiene rubber, trans-poly(octenamer), polychloroprene (CR), carboxylated nitrile rubber, hydrogenated nitrile rubber, and hexachlorocyclopentadiene adduct with polybutadiene, and the like), adhesion promoter (diisocyanates, polyisocyanates, epoxy resins, epoxy-phenolic resins, maleimides, and the like), or a combination thereof. In an embodiment, the substrate does not have a primer thereon.

Various ways of impacting the substrate with the particles are contemplated and include providing relative motion between the particles and the substrate by electrostatic coating, rotational coating, thermal spraying, and the like. According to an embodiment, the particles are disposed in an injector and then subsequently ejected from the injector to impact the substrate. Particles from the injector can be ejected with an energy effective to bond the particles to the substrate.

The injector can be heated to a temperature effective to melt the particles or a constituent thereof, e.g., the polyphenyl polymer. In an embodiment, the injector is heated to a temperature effective to crosslink the polyphenyl polymer in the particles. The temperature at which the particles are heated can be greater than a melting temperature of the polyphenyl polymer and less than a decomposition temperature of the polyphenyl polymer. The temperature can be from 30° C. to 450° C., specifically 70° C. to 400° C., and more specifically 100° C. to 350° C. In some embodiments, the polyphenyl polymer can be crosslinked by a crosslinker before or after ejection from the injector and prior to impacting the substrate due to the elevated temperature of the injector.

In an embodiment, the injector can be biased with an electric potential that is different than that of the substrate such that upon ejection from the injector the particles are accelerated toward the substrate through an electric field. The particles can be accelerated to an energy effective to bond the particles to the substrate. Here, it is contemplated that the particles can be charged in response to ejection from the injector, or the particles can have an intrinsic charge, dipole or higher order molecular moment, or the like that causes acceleration of the particles through the field. In an embodiment, the substrate and particles are disposed in a chamber, e.g., a rotational coating device, that is subjected to rotary motion. Here, the substrate can be rotated to induce impact of the substrate with the particles.

Upon impact, the particles adhere to the substrate. The particles can be directly adhered to the substrate, indirectly adhered, or a combination thereof. In addition to or as an alternative to the particles being heated before impacting the substrate, the substrate can be heating before, during, or after impact of the particles. In this manner, the particles that adhere to the substrate can deform, adhere, and form a strong bond to the substrate. The bond can be through physisorption or chemisorption of the particles on the substrate. Thus, the particle bond to the surface can include adhesion, charge exchange, van der Waals interactions, London dispersion forces, covalent bonds, ionic bonds, or the like, or a combination thereof. The type of bonding that occurs between the crosslinked substrate and the particles can be determined by X-ray photoelectron spectroscopy (XPS), surface-enhanced Raman scattering spectroscopy (SERS), and the like. An overlayer is thus formed by bonding the particles to the substrate.

According to an embodiment, particles in the overlayer are crosslinked to coat the substrate with a crosslinked polymer coating. The crosslinked polymer coating contains a network of crosslinks among the particles bound to the substrate in the overlayer as well as intraparticle crosslinks among the polyphenyl polymer in individual particles. Here, the substrate can be heated to a temperature effective to form the crosslinked polymer coating by crosslinking the polyphenyl polymer in the particles and between the particles. When the particles include a crosslinker, crosslinks can be formed using the crosslinker in the particles. In an embodiment, a crosslinker such as oxygen from air (or an external supply of a gas that contains an oxidant or oxidizer) can be used to crosslink the polyphenyl polymer in the particles in the absence of, or in addition to, a crosslinker in the particles. In addition to crosslinking the particles, the temperature also can sinter the particles in order to fill a gap between particles or between the particles and the substrate.

After forming the crosslinked polymer coating, the coated substrate (including the crosslinked polymer coating) can be cooled from the temperature at which crosslinking occurs.

Subsequent to forming the crosslinked polymer coating, the coated substrate can be heated for post-curing the crosslinked polymer coating. The temperature for crosslinking and post-curing can be the same or different and can independently be from 70° C. to 300° C., specifically 100° C. to 250° C. The time for crosslinking or post-curing the crosslinked polymer coating is less than that for crosslinking or post-curing a bulk polymer material such as the time needed in compression molding. For the crosslinked polymer coating, the time can be from 0.5 minutes to 6 hours, specifically 0.5 minutes to 1 hour, and more specifically 0.5 minutes to 10 minutes.

The crosslinked polymer coating thus formed on the substrate can completely cover the substrate or a surface of the substrate. The thickness of the crosslinked polymer coating can be controlled through deposition of the particles on the substrate and can be from 10 μm to 3000 μm, specifically 10 μm to 2500 μm, more specifically 10 μm to 1500 μm, yet more specifically 10 μm to 500 μm, and even more specifically 10 μm to 150 μm. The crosslinked polymer coating is continuous and has a high crosslink density such that the coating does not have voids, microvoids, fractures, or other defects, including pinholes and the like.

The crosslinked polymer coating has excellent abrasion resistance, wear properties, is much more flexible in comparison to other coatings especially with regard to use at a temperate greater than a glass transition temperature of the crosslinked polymer coating, and has excellent corrosion and chemical resistance, durability, high temperature performance, and outstanding electrical properties.

The crosslinked polymer coating is impervious and resistant to decomposition or compromise of its barrier property by a fluid that comprises an acid, base, gas, completion fluid, oil, polar solvent, nonpolar solvent, or a combination thereof. Exemplary fluids also include those typically encountered downhole, such as hydrocarbons, solvents, or an aqueous environment that includes formation water, seawater, salt (i.e., brine, including formates and inorganic salts, e.g., NaCl, KCl, $CaCl_2$, $MgCl_2$, $CaBr_2$, $ZnBr_2$, NaBr, and the like), completion brine, stimulation treatment fluid, remedial cleanup treatment fluid, acidic or corrosive agent such as hydrogen sulfide, hydrochloric acid, or other such corrosive agents, or a combination thereof. Solvents include an inorganic solvent, organic solvent, or a combination thereof. Exemplary solvents include water, alcohols (e.g., methanol, ethanol, and the like), polyhydric alcohols (e.g., diethylene glycol, dipropylene glycol, 1,2-propanediol, 1,4-butanediol, 1,3-butanediol, glycerol, 1,5-pentanediol, 2-ethyl-1-hexanol, and the like), ketones (e.g., acetophenone, methyl-2-hexanone, and the like), ethers (e.g., ethylene glycol monobutyl ether, triethylene glycol monomethyl ether, and the like), carboxylic acid esters (e.g., [2,2-butoxy(ethoxy)]ethyl acetate and the like), esters of carbonic acid (e.g., propylene carbonate and the like), inorganic acids (e.g., hydrofluoric acid, hydrochloric acid, phosphoric acid, sulfuric acid, nitric acid, and the like), organic acids (e.g., those having an C1-C10 alkyl chain, which is a straight or branched chain and can be substituted), or a combination thereof.

In an embodiment, the substrate (e.g., a polyamide or polyimide) is susceptible to water or polar solvents and weakens in their presence. In another embodiment, the substrate (e.g., tetrafluoroethylene-propylene elastomeric copolymer) is susceptible to hydrocarbons such as oil. In yet another embodiment, the substrate (e.g., a metal alloy) is susceptible to acid, base, or brine. By forming the crosslinked polymer coating on such a substrate, the substrate is protected from such fluids (water, polar solvents, nonpolar solvents, hydrocarbons, gases, and the like) that can compromise the substrate chemically, mechanically, physically, or a combination thereof.

That is, the crosslinked polymer coating is a barrier that protects and does not allow or allows a minimum amount of the fluid to contact the substrate. Therefore, by forming the crosslinked polymer coating on a substrate that is susceptible to environmental factors including fluids, the crosslinked polymer coating increases the use and lifetime of the substrate. Moreover, for a material such as polyamide that ordinarily succumbs to water exposure, this substrate can be used in previously incompatible environments by virtue of the presence of the crosslinked polymer coating.

The crosslinked polymer coating herein thus has beneficial material properties, including excellent solvent resistance, electrical insulating or conducting properties, thermal insulating or conducting properties, high scratch resistance, high abrasion resistance, low flammability, impermeability of an agent for transmission to the underlying substrate, and high inertness and stability. Moreover, the crosslinked polymer coating and coated substrate further can be processed by machining techniques to fabricate them into various shaped articles. Machining techniques include drilling, milling, lathing, lapping, cutting, and the like.

Further, the crosslinked polymer coating has a high melting temperature such that the crosslinked polymer coating advantageously can be used over a wide temperature range, for example, from less than 0° C. to 450° C. In an embodiment, the crosslinked polymer coating has a thermal decomposition temperature greater than 200° C., specifically greater than 300° C., more specifically greater than 370° C., even more specifically greater than 400° C. The glass transition temperature (Tg) can be from 80° C. to 220° C., specifically 100° C. to 220° C., and more specifically 100° C. to 200° C., depending on the constituents of the polymer formulas. Thus, above the Tg of the crosslinked polymer coating, the coated substrate (having the crosslinked polymer coating) can flex, bend, or stretch without detriment to the crosslinked polymer coating and its bonding to the substrate.

In an embodiment, the coefficient of expansion of the crosslinked polymer coating and substrate can be substantially the same or matched such that the crosslinked polymer coating does not peel and stays affixed to the substrate under various conditions, such as stretching, heating, bending, impacting, irradiating with light, applying solvent, increasing pressure across the crosslinked polymer coating or substrate, and the like. Even if the thermal expansion of the substrate is different than the crosslinked polymer coating at a low temperature, the crosslinked polymer coating is an elastomer above its Tg to accommodate expansion or contraction of the substrate with a change in temperature.

The crosslinked polymer coating on the substrate has a high peel strength effective to maintain its bond to the substrate without peeling from the substrate even under stress or strain. The peel strength (i.e., an average force to separate the crosslinked polymer coating and the substrate) is greater than 500 pounds per square inch (psi), specifically greater than 800 psi, and more specifically greater than 1200 psi.

In an embodiment, the crosslinked polymer coating is electrically conductive, thermally conductive, or a combination thereof. Electrical and thermal conductivity of the crosslinked polymer coating can be achieved by including the nanofiller or another additive in the particles to impart this characteristic to the coating after crosslinking the polyphenyl polymer to form the coating. Thus, articles formed from the crosslinked polymer coating can advantageously be electrically (or thermally) conductive or nonconductive.

The crosslinked polymer coating described herein has many uses. In an embodiment, the article includes a substrate and a crosslinked polymer coating bonded to the substrate.

The crosslinked polymer coating is a product of crosslinking polyphenylene sulfide, polyphenylsulfone, self-reinforced polyphenylene, polyaryletherketone, or a combination thereof on a surface of the substrate.

Such an article can be a downhole tool, tubular, pipeline, flow control device, filter, membrane, sand screen, motor cover, mesh, sheet, packer element, blow out preventer element, submersible pump motor protector bag, sensor protector, sucker rod, O-ring, T-ring, gasket, pump shaft seal, tube seal, valve seal, seal for an electrical component, insulator for an electrical component, seal for a drilling motor, and the like.

Such an article can be used in a downhole environment, aquatic environment, or space environment where pressure changes deleteriously can affect certain substrates, including explosive decompression of the substrate. However, due to the robust properties of the crosslinked polymer coating and its high bonding strength to the substrate, the article is saved from such effects, and the article stays intact with the crosslinked polymer coating bonded to the substrate.

An article having a substrate without the crosslinked polymer coating can have flaws such as voids and veins that a liquid or gas can enter. For such an article, a positive internal pressure in the voids is created as fluid enters these voids. When the external pressure is decreased such as under depressurization conditions (e.g., ascent to the surface from downhole), the fluid flows that entered the voids in the article attempts to rapidly flow out of the article, which can cause damage to the article such as blisters on the article, ruptures, or fractures. Internal damage can occur without external evidence thereof. The articles herein with the crosslinked polymer coating on the substrate decrease or eliminate such effects from explosive decompression.

While one or more embodiments have been shown and described, modifications and substitutions may be made thereto without departing from the spirit and scope of the invention. Accordingly, it is to be understood that the present invention has been described by way of illustrations and not limitation. Embodiments herein are can be used independently or can be combined.

All ranges disclosed herein are inclusive of the endpoints, and the endpoints are independently combinable with each other. The ranges are continuous and thus contain every value and subset thereof in the range. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A method for coating a substrate, the method comprising:
    impacting a substrate with a plurality of particles such that the particles adhere to the substrate, the particles comprising a polyphenyl polymer;
    bonding the particles to the substrate to form an overlayer; and
    crosslinking the particles in the overlayer to coat the substrate with a crosslinked polymer coating;
    wherein the particles further comprise a crosslinker, the crosslinker comprising one or more of the following: sulfur; a peroxy compound; a metal peroxide; or a metal oxide; wherein the metal oxide comprises one or more of the following: zinc oxide;
    magnesium oxide; or titanium dioxide.

2. The method of claim 1, further comprising heating the substrate to a temperature effective to crosslink the polyphenyl polymer prior to forming the crosslinked polymer coating.

3. The method of claim 1, further comprising post-curing the crosslinked polymer coating subsequent to forming the crosslinked polymer coating.

4. The method of claim 3, wherein crosslinking and post-curing are independently conducted for a time from 0.5 minutes to 60 minutes.

5. The method of claim 1, further comprising crosslinking the polyphenyl polymer with the crosslinker prior to impacting the substrate with the particles.

6. The method of claim 5, wherein the crosslinker is present in an amount from 0.5 wt % to 10 wt %, based on a weight of the polyphenyl polymer.

7. The method of claim 1, further comprising heating the particles prior to impacting the substrate, wherein heating is to a temperature greater than a melting temperature of the polyphenyl polymer and less than a decomposition temperature of the polyphenyl polymer.

8. The method of claim 7, wherein heating the particles is conducted at a temperature effective to crosslink the polymer.

9. The method of claim 1, further comprising accelerating the particles by an electric field prior to impacting the substrate with the particles.

10. The method of claim 1, further comprising rotating the substrate to induce impacting the substrate with the particles.

11. The method of claim 1, wherein the polyphenyl polymer comprises polyphenylene sulfide, polyphenylsulfone, self-reinforced polyphenylene, polyaryletherketone, a crosslinked product thereof, or a combination thereof.

12. The method of claim 11, wherein the self-reinforced polyphenylene comprises a repeat unit which comprises benzoyl-1,4-phenylene, 1,3-phenylene, phenoxybenzoyl-1,4-phenylene, or a combination thereof.

13. The method of claim 1, wherein the particles further comprise an additive which comprises a nanofiller, silica, glass fiber, carbon fiber, carbon black, pigment, dye, stabilizer, flow improver, plasticizer, or a combination thereof.

14. The method of claim 1, wherein the substrate comprises a metal, polymer, ceramic, glass, paper, wood, or a combination thereof.

15. The method of claim 1, wherein the crosslinked polymer coating has a thickness from 10 μm to 3000 μm.

16. The method of claim 1, wherein the crosslinked polymer coating is impervious to a fluid which comprises an acid, base, gas, completion fluid, oil, polar solvent, nonpolar solvent, or a combination thereof.

17. The method of claim 1, wherein the crosslinked polymer coating has a decomposition temperature greater than 400° C.

18. The method of claim 1, wherein the crosslinker comprises sulfur and a metal peroxide.

19. The method of claim 18, wherein the metal peroxide comprises one or more of the following: magnesium peroxide; calcium peroxide; or zinc peroxide.

\* \* \* \* \*